Nov. 2, 1965   J. L. KERR   3,216,014
DOPPLER RADAR TARGET SIMULATOR
Filed Dec. 6, 1963

INVENTOR,
JOHN L. KERR
BY: Harry M. Saragovitz,
Edward J. Kelly,
Herbert Berl &
Julian C. Keppler   ATTORNEYS.

United States Patent Office 3,216,014
Patented Nov. 2, 1965

3,216,014
DOPPLER RADAR TARGET SIMULATOR
John L. Kerr, Neptune, N.J., assignor to the United States of America as represented by the Secretary of the Army
Filed Dec. 6, 1963, Ser. No. 328,767
6 Claims. (Cl. 343—17.7)
(Granted under Title 35, U.S. Code (1952), sec. 266)

The invention described herein may be manufactured and used by or for the Government for governmental purposes without the payment of any royalty thereon.

This invention relates to waveguide transmission systems and more particularly to a rotating waveguide transmission system for simulating moving targets in Doppler radar applications or for use as RF phase and frequency shifters.

Heretofore, waveguide target simulators for Doppler radar applications usually comprised slotted waveguide structures or rotating reflectors. Such target simulators have proved to be rather bulky and were susceptible to RF leakage. Also the phase shift per r.p.m. in such prior systems was inadequate for very high frequency Doppler radar.

It is an object of the present invention to provide a waveguide target simulator for Doppler radar systems wherein the aforementioned limitations are overcome.

It is another object of the present invention to provide a rotatable waveguide target simulator and RF phase and frequency shift which is simple in construction and design and is adapted to maintain extremely close tolerances at millimeter wavelength operation.

It is another object of the present invention to provide a waveguide target simulator for Doppler radar having a capability of simulating higher radial speeds than heretofore practical.

In accordance with the present invention there is provided a radar target simulator which includes an annular hollow waveguide split midway along a transverse plane. One hollow waveguide section is stationary and the other waveguide section is rotated relative thereto. Also included are waveguide means affixed to the stationary split waveguide section for coupling RF energy into and out of the annular hollow waveguide. Included further is a first RF energy shorting plug mounted across the stationary waveguide section adjacent the coupling waveguide such that the RF energy is reflected in one direction along the annular hollow waveguide, and a second RF energy shorting plug mounted across the rotating waveguide section to intercept and again reflect the RF energy in a direction towards the coupling waveguide.

Figure 1:
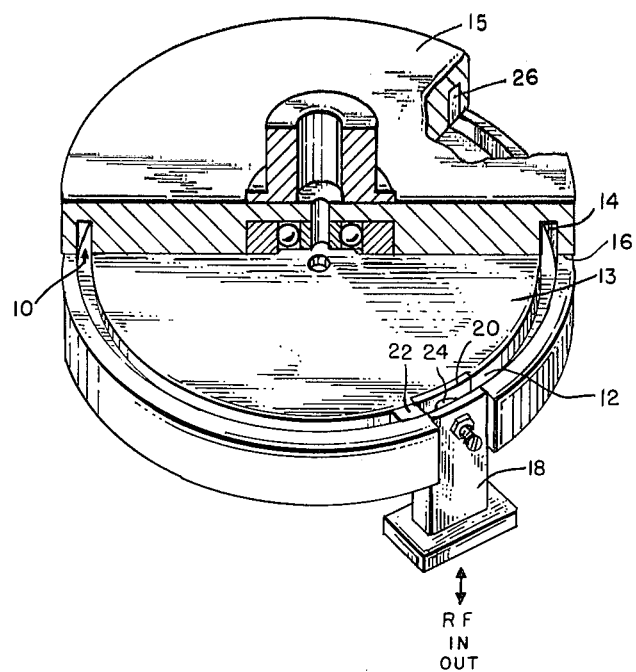
Figure 2:
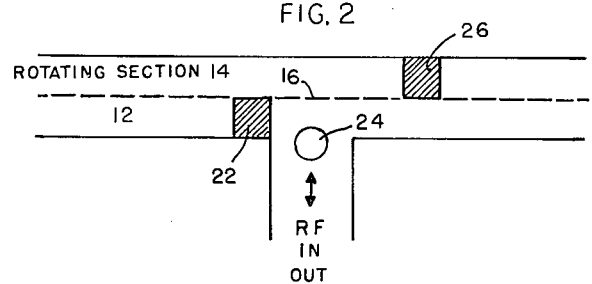

For a better understanding of the invention, together with other and further objects thereof, reference is had to the following description taken in connection with the accompanying drawing in which:

FIG. 1 is an isometric drawing of the present invention partially in cross-section, and FIG. 2 is a schematic representation of the present invention.

Referring now to the drawing, the numeral 10 indicates an annular hollow waveguide which is split midway along a transverse plane to form two complementary superposed waveguide sections 12 and 14 having an annular space 16 therebetween so that one section can be rotated relative to the other. The respective waveguide sections 12 and 14 are identical annulations rectangular in cross-section. Annular waveguide section 12 is an integral part of disc member 13 and annular waveguide section 14 is an integral part of disc member 15. The annular space 16 should be as close as tolerances will permit and since it is located centrally of the waveguide where the current density is at a minimum, the losses are minimized. As shown, the wider dimension of waveguide 10 extends in the axial direction. A rectangular waveguide 18 having its narrow dimension equal to the narrow dimension of waveguide 10 is coupled to one complementary waveguide section, 12 for example, and is orthogonally positioned with respect to the narrow wall or base of complementary waveguide section 12. A portion of the complementary waveguide section 12 is cut away to provide an opening or gap for receiving the coupling waveguide 18. As shown, the wide walls of coupling waveguide 18 are coextensive with the wide walls of waveguide section 12 and extend through gap 20 to the periphery thereof. The narrow wall portions of coupling waveguide 18 are terminated at the base of waveguide section 12. A metallic shorting plug 22, providing an effective RF energy short, is connected across the wide walls of waveguide section 12 for the full depth thereof such that it effectively provides an extension of one narrow wall of coupling waveguide 18 from the base of waveguide section 12 to the periphery of the wide walls thereof. The shorting plug 22 thus effectively forms a 90° H-plane corner and may be matched by any suitable means, a metallic disc 24 for example, within the gap 20 to minimize reflections. A metallic shorting plug 26 identical to metallic plug 22 and also providing an RF energy short circuit, is positioned at any point within the other complementary waveguide section 14 to exectively provide a short thereacross. Any suitable means well known in the art may be used to rotate complementary waveguide section 14 with respect to complementary waveguide section 12 to which the RF energy is fed.

FIG. 2 illustrates schematically the structure shown in FIG. 1. With the input guide 18 mounted in one half of the waveguide 10, i.e. section 12, a shunt-T is formed and the waveguide loop may be formed by folding the arms of the shunt-T so that the ends thereof are joined. It is to be understood, of course, that the input waveguide 18 may be in the plane of the waveguide loop without changing the operation of the invention.

To simulate a Doppler radar target, an RF input is fed to waveguide 18 and the section 14 is rotatably driven by any suitable means. The entering RF energy is reflected by shorting plug 22 so that the energy travels around the waveguide loop in only one direction until it sees the shorting plug 26 in rotating section 14. From this point, the RF energy is reflected back around the waveguide loop to the input guide 18 and thus fed back to the original RF source. Since the shorting plug 24 is continually moving, the phase of the return RF energy signal is varying at a rate either slower or faster than the source signal thereby resulting in a new frequency $f_0 \pm \Delta f_0$, where $f_0$ is the input or source frequency. The difference in frequency between the source frequency $f_0$ and the return phase shifted signals may be detected as the Doppler frequency by any suitable means. An approaching or receding target may be simulated by simply reversing the direction of rotation. It has been found that by utilizing the present invention the rotational speed required to simulate a given target radial speed is considerably reduced. For example, with the mean diameter of the waveguide loop approximtaely four inches, an X-band frequency source required a rotational speed of approximately 1800 r.p.m. to simulate a target radial speed of 20 m.p.h.

While there has been described what is at present considered to be the preferred embodiment of this invention, it will be obvious to those skilled in the art that various changes and modifications may be made therein

What is claimed is:

1. A radar target simulator comprising an annular hollow waveguide split midway along a transverse plane, one split section hollow waveguide being stationary and the other waveguide section being adapted to be rotated, waveguide means affixed to said stationary split wave guide section for coupling RF energy into and out of said annular hollow waveguide, a first RF energy reflector mounted adjacent said coupling waveguide across the stationary split waveguide section whereby the RF energy is reflected in one direction along said annular hollow waveguide, and a second RF energy reflector mounted across the rotating waveguide section for intercepting and directing RF energy toward said waveguide coupling means.

2. The radar target simulator in accordance with claim 1 wherein said first RF energy reflector comprises a 90° H-plane corner reflector.

3. A radar target simulator comprising a waveguide loop formed by two complementary superposed annular waveguide sections of rectangular cross-section and having an annular space therebetween, said waveguide sections being axially aligned with the wider dimension thereof extending in the axial direction, means for rotating one of said annular waveguide sections relative to the second annular waveguide section, waveguide means affixed to said second annular waveguide section for coupling RF energy into and out of said waveguide loop, a first RF energy reflector mounted adjacent said coupling waveguide across said second annular waveguide section whereby the RF energy is reflected along one direction in said waveguide loop, and a second RF energy reflector mounted across said one annular waveguide section for intercepting and directing RF energy toward said waveguide coupling means.

4. The radar target simulator in accordance with claim 3 where said waveguide coupling means is rectangular in cross-section, the wide walls thereof being coextensive with the wide walls of said second annular waveguide section.

5. The radar simulator in accordance with claim 3 wherein said first and second RF energy reflectors comprise metallic plugs.

6. The radar target simulator in accordance with claim 5 and further including a metallic disc mounted within said coupling waveguide along the arcuate path of said second annular waveguide section.

No references cited.

LEWIS H. MYERS, *Primary Examiner.*

R. E. KLEIN, *Assistant Examiner.*